United States Patent [19]

Glatzel et al.

[11] 3,828,755
[45] Aug. 13, 1974

[54] AUXILIARY STARTER FOR DIESEL ENGINES

[75] Inventors: Hartmut Glatzel, Stuttgart; Herbert Langen, Altbach, both of Germany

[73] Assignee: J. Eberspacher, Esslingen/Neckar, Germany

[22] Filed: July 31, 1972

[21] Appl. No.: 276,856

[30] Foreign Application Priority Data

Aug. 2, 1971  Austria ............................... 6730/71

[52] U.S. Cl. ...... 123/179 H, 123/122 D, 123/122 G
[51] Int. Cl. . F02n 17/02, F02p 21/02, F02m 31/06
[58] Field of Search ......... 123/179 H, 122 G, 122 D

[56] References Cited
UNITED STATES PATENTS

| | | | |
|---|---|---|---|
| 1,334,446 | 3/1920 | Good | 123/122 G |
| 1,387,848 | 8/1921 | Good | 123/179 H |
| 1,843,257 | 2/1932 | Woolson | 123/122 G |
| 2,251,084 | 7/1941 | Tucker | 123/122 G |
| 3,020,903 | 2/1962 | Kloss | 123/179 HX |
| 3,687,122 | 8/1972 | Kamo | 123/122 G |

FOREIGN PATENTS OR APPLICATIONS

| | | | |
|---|---|---|---|
| 191,025 | 12/1922 | Great Britain | 123/122 G |

*Primary Examiner*—Charles J. Myhre
*Assistant Examiner*—W. Rutledge, Jr.
*Attorney, Agent, or Firm*—McGlew and Tuttle

[57] ABSTRACT

An auxiliary starter, for diesel engines having combustion chambers connected to an intake air pipe through which combustion air, heated directly by a fuel burning device, is supplied to the combustion chambers, comprises an annular combustion chamber on the intake air pipe. A flap-type throttle valve is mounted in tee air intake pipe in advance of the combustion chamber, and may be closed by a magnet through a spring, the magnet being controlled by a control device. A bypass is connected into the intake air pipe upstream of the flap valve and is connected to the combustion chamber. A valve, controlled by the control device, controls flow of fuel into the bypass, and an ignition device in the form of a spark plug or a glow plug is provided in the combustion chamber to ignite the fuel air mixture. Preferably, the bypass opens tangentially into the combustion chamber. The flap valve is so arranged that the air necessary for combustion is controlled automatically in dependence on the underpressure.

5 Claims, 1 Drawing Figure

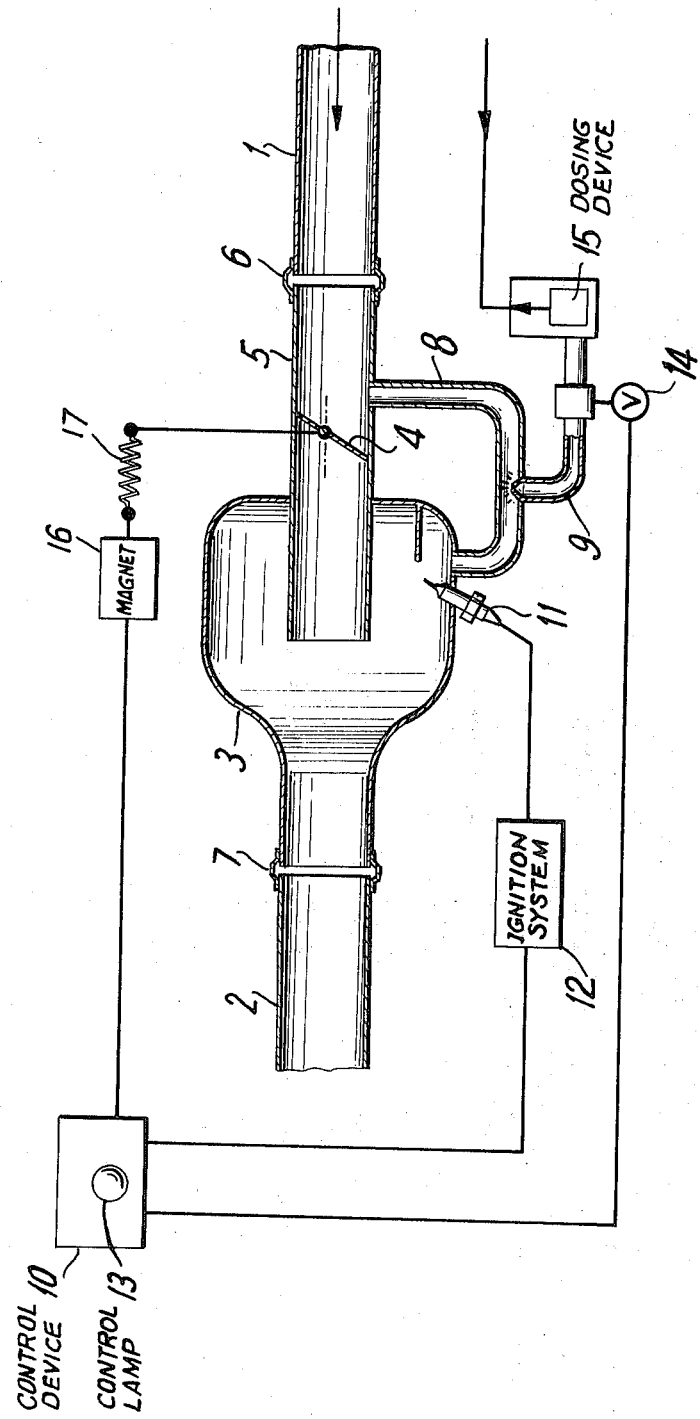

AUXILIARY STARTER FOR DIESEL ENGINES

FIELD AND BACKGROUND OF THE INVENTION

This invention relates to an auxiliary starter for diesel engines whose combustion chambers are connected to an intake air pipe through which combustion air, heated directly by a fuel burning device, is supplied to the combustion chambers.

For the operation of diesel engines, it is important to feed fuel and combustion air to the combustion chambers in such a state that ignition can start as soon as a corresponding compression pressure has been attained by the piston movement. Furthermore, it is important that the combustion chambers be supplied uniformly, in order to achieve a smooth running of the engine. During operation of a diesel engine, combustion is effected by the high temperature prevailing in the combustion chamber, due to the compression and the wall temperature, the combustion air taken in through the intake air pipe being drawn into the hot combustion chamber and the fuel being fed into the combustion chamber. Smooth running of the engine is attained by the same combustion temperature prevailing in all the combustion chambers, and by uniform fuel supply to all of the combustion chambers.

However, the conditions are different in starting of a diesel engine, that is, with cold combustion chambers. In this case, the combustion air must be supplied uniformly to all combustion chambers at such a temperature that ignition is effected by the addition of fuel to the combustion chambers.

There are already known auxiliary starters which meet these requirements, where the combustion chambers are connected to an intake pipe of the engine and where the combustion air, heated directly by a fuel burning device, is supplied to the combustion chambers. In these known arrangements, flame tubes are arranged in the intake pipe, by means of which the combustion air is heated and then supplied to the combustion chambers. This known arrangement has the disadvantage, however, that the heating period is longer, due to the heat transfer from the flame tube to the combustion air in the intake pipe, and that the intake pipe must be considerably widened in this heating system, due to the installation of the flame tubes.

It has therefore been tried to supply to the intake pipe an easily ignitable fuel-air mixture, to ignite it in the intake pipe, and to feed the combustion air to the combustion chambers with a corresponding temperature. However, it was found that an irregular heat distribution was unavoidable because of the shortness of the intake pipe, and that the individual cylinders are therefore unevenly supplied. Another disadvantage results from the necessary use of a foreign fuel (gasoline) and from the longer preliminary heating time.

SUMMARY OF THE INVENTION

The present invention is directed to the problem of providing an auxiliary starter, for diesel engines, with which an immediate ignition is possible by using an engine's specific fuel. Starting from the above-described arrangement, this problem is solved in that the fuel burning device is designed as a combustion chamber on the intake air pipe. It has been found particularly expedient to design the combustion chamber as an annular combustion chamber. In order to reduce further the installation dimensions and to arrange the combustion chamber, embodying the invention, as close as possible to the combustion chambers of the engine, it was found more expedient to arrange the annular combustion chamber so that it surrounds the intake air pipe.

The advantages achieved with the present invention consist particularly in that the engine can be ignited immediately with the engine's specific fuel. The engine need not differ from the general concept, even in the case of a multi-fuel design, so that all deisel engines can be equipped with the auxiliary starter embodying the invention. Another important advantage of the invention is that it can be used for continuous operation, because it has been found, surprisingly, that a satisfactory ignition is possible even in continuous operation and that the annoying preliminary heating of the plugs is not necessary, and that the ignition can also be effected during operation by the temperature of the combustion chambers, so that the electrical system of the vehicle can be spared since it is in operation only when the engine is started cold.

An object of the invention is to provide an improved auxiliary starter for diesel engines having combustion chambers connected to an intake air pipe through which combustion air, heated directly by a fuel burning device, is supplied to the combustion chambers.

Another object of the invention is to provide such an auxiliary starter in the form of a combustion chamber on the intake air pipe.

A further object of the invention is to provide such an auxiliary starter in which the combustion chamber is an annular combustion chamber.

Another object of the invention is to provide such an auxiliary starter with which an immediate ignition is possible by using the engine's specific fuel.

For an understanding of the principles of the invention, reference is made to the following description of a typical embodiment thereof as illustrated in the accompanying drawing.

BRIEF DESCRIPTION OF THE DRAWING

In the drawing:

The single FIGURE is a partly schematic sectional view of the auxiliary starter, embodying the invention, in the form of a combustion chamber designed as an annular combustion chamber surrounding the intake air pipe.

DESCRIPTION OF THE PREFERRED EMBODIMENT

Referring to the drawing, the combustion air to be supplied to the combustion chambers of a diesel engine, for combustion, is drawn in through an intake and through an air filter. In the single FIGURE of the drawing, this intake air pipe is represented separately with its section 1, leading from the air filter, and with its section 2, leading to the engine. Between these two sections 1 and 2, there is arranged the combustion chamber embodying the invention. Combustion chamber 3, of the auxiliary starter of the invention, can be arranged at any point on or in the intake air pipe, but the installation is effected as close as possible to the cylinders of the engine in order to achieve a better and possibly heat loss-free supply of the heated combustion air to the combustion chambers of the engine.

This is possible, for example, if the combustion chamber 3 is arranged on the intake air pipe 1, 2 not in the manner of a secondary chamber but, in accordance with a further development of the invention, as an annular combustion chamber surrounding the intake air pipe 1, 2 as represented in the drawing. In this case, the intake air pipe section 1 is extended into the annular combustion chamber 3 through a pipe 5 provided with a throttle flap valve 4, and combustion chamber 3 is connected to intake air pipe section 2. The auxiliary starter of the invention thus can be installed, even subsequently, as a separate part between the connecting points or couplings 6 and 7.

In order to supply the combustion air necessary for combustion in combustion chamber 3, a bypass 8 is arranged between intake air pipe section 1, particularly pipe connection 5 connected to section 1, and combustion chamber 3. It has been found particularly advantageous that a fuel pipe 9, terminating in bypass 8, is provided to feed an ignitable fuel-air mixture to combustion chamber 3. In intake air pipe section 1, and particularly pipe connection 5 connected thereto, the throttle flap valve 4 is arranged downstream of the connection of bypass 8 to pipe section 5, and is connected to a control device 10. Through control device 10, there is controlled or regulated an ignition means 11, necessary for the ignition of the fuel-air mixture, which is a part of the ignition system 12, as well as the amount of the fuel supply. In further accordance with the invention, the igniter 11 can be a glow or spark igniter. With this auxiliary starter as thus far described, it is possible to start diesel engines with engine-specific fuel by the uniform supply of heated combustion air to the combustion chambers.

In order to achieve a further improvement, by a better ignition and combustion in combustion chamber 3, it is provided, in a further development of the invention, to arrange, in combustion chamber 3, means for producing a twist or swirl. A further improvement can be achieved, according to the invention, by arranging bypass 8 so that it opens tangentially into combustion chamber 3.

The control or regulating system, as a part of the auxiliary starter embodying the invention, comprises, in addition to control device 10 provided with a control lamp 13, which is preferably arranged on the control desk or instrument panel belonging to the diesel engine, a valve 14 for regulating the fuel supply through fuel supply 9, for example, a magnetic valve, as well as a dosing device 15. For controlling the position of throttle flap valve 4, which is preferably mounted on an eccentric shaft, there is provided a traction magnet 16 with a spring 17. When the auxiliary starter embodying the invention is activated, traction magnet 16 is energized through control device 10, and throttle flap valve 4 is closed through spring 17, so that the air required for combustion in combustion chamber 3 is drawn in through bypass 8, which serves at the same time to produce the twist or swirl. The fuel is fed through fuel line 9 through dosing device 15 and magnetic valve 14, opened by control device 10, into bypass 8, and thus fuel-air mixture is supplied to combustion chamber 3.

For ignition of the ignitable mixture, ignition device 12 is activated through control device 10, so that ignition can be effected by means of the glow or spark means 11. During operation of the engine after starting, throttle flap 4 releases the flow of combustion air to the engine through intake air pipe section 1 and pipe connection 5. Since throttle flap valve 4 is so arranged, according to the invention, that the air necessary for combustion, during running of the engine, is controlled automatically in dependence on the underpressure, throttle flap valve 4 is released for automatic operation by control device 10, from control by traction magnet 16, at the same time that igniter 11 and the fuel supply to bypass 8, controlled by magnetic valve 4, are deactivated and interrupted, respectively. This has the effect that the auxiliary starter embodying the invention, which is safe in continuous operation due to its simple design, does not run unnecessarily, but is effective only when it is needed. The automatic underpressure-dependent control of the throttle flap valve position by spring 17 biasing valve 4 toward closure, in accordance with the invention, has the considerable advantage that there is no deflagration of the fuel which has entered a combustion chamber of the engine, since any ignitable fuel-air mixture remaining in combustion chamber 3 is exhausted with the combustion air, unless it is ignited.

While a specific embodiment of the invention has been shown and described in detail to illustrate the application of the principles of the invention, it will be understood that the invention may be embodied otherwise without departing from such principles.

What is claimed is:

1. An auxiliary starter, for diesel engines having cylinder combustion chambers connected to the discharge section of an intake air pipe having an inlet section, and through which intake air pipe combustion air, heated directly by a fuel burning device, is supplied to the cylinder combustion chambers, comprising, in combination, said fuel burning device being designed as an annular combustion chamber surrounding said inlet section of said intake air pipe and exhausting into said discharge section of said intake air pipe; a valve in said air inlet section closed during starting of the engine; a bypass extending between said annular combustion chamber and said air inlet section, upstream of said valve, for supplying combustion air to said annular combustion chamber for combustion of fuel supplied thereto during engine starting; a fuel line communicating with said bypass; said valve being a throttle flap valve arranged in said intake air pipe; a control device connected to said throttle flap valve; an ignition device operable to ignite the fuel-air mixture in said annular combustion chamber; and means regulating the fuel supply; said ignition device and said last-named means being controlled by said control device.

2. An auxiliary starter for diesel engines, as claimed in claim 1, said ignition device comprising a glow means.

3. An auxiliary starter for diesel engines, as claimed in claim 1, said ignition device comprising a spark means.

4. An auxiliary starter for diesel engines, as claimed in claim 1, including means in said annular combustion chamber providing a swirl to the air-fuel mixture directed thereinto.

5. An auxiliary starter for diesel engines, as claimed in claim 1, in which said bypass opens tangentially into said annular combustion chamber.

* * * * *